United States Patent
Moriya et al.

(10) Patent No.: US 10,688,740 B2
(45) Date of Patent: Jun. 23, 2020

(54) METHOD AND DEVICE FOR MANUFACTURING OPTICAL FIBER RIBBON

(71) Applicant: FUJIKURA LTD., Tokyo (JP)

(72) Inventors: Shizuka Moriya, Chiba (JP); Mizuki Isaji, Chiba (JP); Ken Osato, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/077,150

(22) PCT Filed: Dec. 8, 2016

(86) PCT No.: PCT/JP2016/086490
§ 371 (c)(1),
(2) Date: Aug. 10, 2018

(87) PCT Pub. No.: WO2017/154297
PCT Pub. Date: Sep. 14, 2017

(65) Prior Publication Data
US 2019/0022962 A1 Jan. 24, 2019

(30) Foreign Application Priority Data
Mar. 7, 2016 (JP) .................................. 2016-043451

(51) Int. Cl.
*G02B 6/44* (2006.01)
*B29D 11/00* (2006.01)

(52) U.S. Cl.
CPC .......... *B29D 11/00663* (2013.01); *G02B 6/44* (2013.01); *G02B 6/441* (2013.01); *G02B 6/4403* (2013.01); *G02B 6/448* (2013.01)

(58) Field of Classification Search
CPC .................................................... G02B 6/4403
See application file for complete search history.

(56) References Cited

U.S. PATENT DOCUMENTS
2014/0314382 A1   10/2014   Sato et al.

FOREIGN PATENT DOCUMENTS
CN   102822711 A   12/2012
EP   2717082 A1   4/2014
(Continued)

OTHER PUBLICATIONS

Office Action issued in corresponding Korean Application No. 10-2018-7012874 dated Sep. 13, 2018 (8 pages).
(Continued)

*Primary Examiner* — Alex A Rolland
(74) *Attorney, Agent, or Firm* — Osha Liang LLP

(57) ABSTRACT

A method for manufacturing an optical fiber ribbon where adjacent optical fibers are intermittently connected in a length direction includes: feeding the optical fibers along the length direction; and intermittently applying a resin in the length direction by: rotating, between adjacent ones of the optical fibers, a rotating member having a recess, and blocking the resin with a peripheral edge part of the rotating member where the recess is not formed. A moving speed, in the length direction, of the peripheral edge part at a position where the peripheral edge part blocks the resin between the optical fibers is slower than a feeding speed of the optical fibers.

7 Claims, 8 Drawing Sheets

(56) References Cited

FOREIGN PATENT DOCUMENTS

| | | | |
|---|---|---|---|
| JP | 2010-033010 A | | 2/2010 |
| JP | 2010033010 A | * | 2/2010 |
| JP | 2012-208312 A | | 10/2012 |
| JP | 2012-252196 A | | 12/2012 |
| JP | 2013-003516 A | | 1/2013 |
| JP | 2015-052704 A | | 3/2015 |
| JP | 2015-132682 A | | 7/2015 |

OTHER PUBLICATIONS

Office Action issued in corresponding Canadian Application No. 3,012,585 dated Aug. 7, 2018 (4 pages).
Notification of Reasons for Refusal issued in corresponding Japanese Patent Application No. 2016-043451 dated Nov. 28, 2016, with translation (4 pages).
Office Action issued in corresponding Australian Application No. 2016396813 dated Sep. 4, 2018 (5 pages).

* cited by examiner

| OPTICAL FIBER FEEDING SPEED V1 [m/min] | ROTATING MEMBER MOVING SPEED V2 [m/min] | SPEED RATIO (V1:V2) | MINIMUM THICKNESS d OF RESIN [μm] | TEARING TEST [gf] | | | STRAIN/BEND TEST | | EVALUATION |
|---|---|---|---|---|---|---|---|---|---|
| | | | | MAXIMUM VALUE | MINIMUM VALUE | AVERAGE VALUE | PRESENCE OF BREAKAGE OF CONNECTION PARTS | | |
| 150.0 | 282.6 | 0.5:1 | 4.3 | 0.4 | 0.1 | 0.3 | YES | | POOR |
| 300.0 | 282.6 | 1.1:1 | 3.5 | 0.9 | 0.5 | 0.7 | YES | | POOR |
| 400.0 | 188.4 | 2.1:1 | 4.9 | 1.8 | 1.3 | 1.2 | YES | | POOR |
| 600.0 | 207.3 | 2.9:1 | 6.8 | 3.9 | 2.1 | 3.1 | NO | | GOOD |
| 600.0 | 141.3 | 4.2:1 | 7.6 | 8.8 | 4.1 | 5.4 | NO | | GOOD |
| 900.0 | 150.9 | 6.0:1 | 10.2 | 8.6 | 3.0 | 5.4 | NO | | GOOD |
| 900.0 | 113.1 | 8.0:1 | 8.8 | 11.8 | 4.3 | 7.3 | NO | | GOOD |

FIG. 5A

| OPTICAL FIBER FEEDING SPEED V1 [m/min] | ROTATING MEMBER MOVING SPEED V2 [m/min] | SPEED RATIO (V1:V2) | MINIMUM THICKNESS d OF RESIN [μm] | LENGTH DIFFERENCE [%] | | | STRAIN/BEND TEST | | EVALUATION |
|---|---|---|---|---|---|---|---|---|---|
| | | | | MAXIMUM VALUE | MINIMUM VALUE | AVERAGE VALUE | PRESENCE OF BREAKAGE OF CONNECTION PARTS | | |
| 450.0 | 45.3 | 9.9:1 | 9.5 | 0.01 | -0.02 | 0.01 | NO | | GOOD |
| 900.0 | 59.4 | 15.2:1 | 10.1 | 0.01 | -0.01 | 0.00 | NO | | GOOD |
| 400.0 | 19.2 | 20.8:1 | 8.9 | 0.01 | -0.03 | 0.01 | NO | | GOOD |
| 400.0 | 15.6 | 25.6:1 | 7.6 | 0.03 | -0.02 | 0.02 | NO | | GOOD |
| 900.0 | 30.3 | 29.7:1 | 11.1 | 0.04 | -0.01 | 0.02 | NO | | GOOD |
| 600.0 | 17.1 | 35.1:1 | 7.8 | 0.02 | -0.03 | 0.02 | NO | | GOOD |
| 600.0 | 15.0 | 40.0:1 | 8.2 | 0.13 | -0.01 | 0.08 | NO | | POOR |
| 600.0 | 13.2 | 45.5:1 | 9.0 | 0.12 | -0.03 | 0.09 | NO | | POOR |

FIG. 5B

| SPEED RATIO (V1:V2) | TEARING TEST [gf] | | | STRAIN/BEND TEST | EVALUATION |
|---|---|---|---|---|---|
| | MAXIMUM VALUE | MINIMUM VALUE | AVERAGE VALUE | PRESENCE OF BREAKAGE OF CONNECTION PARTS | |
| 1.1:1 | 1.3 | 0.7 | 1.0 | YES | POOR |
| 2.1:1 | 1.5 | 0.9 | 1.3 | YES | POOR |
| 2.9:1 | 3.5 | 2.0 | 2.8 | NO | GOOD |
| 4.2:1 | 6.7 | 3.7 | 4.9 | NO | GOOD |

FIG. 6

ROTATING MEMBER HAVING DIAMETER OF 5 mm AND THICKNESS OF 80 μm

| SPEED RATIO (V1:V2) | MINIMUM THICKNESS d OF RESIN [μm] | TEARING TEST [gf] | | | STRAIN/BEND TEST | EVALUATION |
|---|---|---|---|---|---|---|
| | | MAXIMUM VALUE | MINIMUM VALUE | AVERAGE VALUE | PRESENCE OF BREAKAGE OF CONNECTION PARTS | |
| 1.1:1 | 2.5 | 1.3 | 0.4 | 0.8 | YES | POOR |
| 2.1:1 | 3.1 | 1.8 | 0.9 | 1.4 | YES | POOR |
| 2.9:1 | 7.3 | 5.0 | 4.4 | 4.8 | NO | GOOD |
| 4.2:1 | 8.1 | 5.6 | 3.8 | 4.2 | NO | GOOD |

FIG. 7A

ROTATING MEMBER HAVING DIAMETER OF 25 mm AND THICKNESS OF 80 μm

| SPEED RATIO (V1:V2) | MINIMUM THICKNESS d OF RESIN [μm] | TEARING TEST [gf] | | | STRAIN/BEND TEST | EVALUATION |
|---|---|---|---|---|---|---|
| | | MAXIMUM VALUE | MINIMUM VALUE | AVERAGE VALUE | PRESENCE OF BREAKAGE OF CONNECTION PARTS | |
| 1.1:1 | 2.7 | 0.9 | 0.3 | 0.5 | YES | POOR |
| 2.1:1 | 4.2 | 2.0 | 0.9 | 1.5 | YES | POOR |
| 2.9:1 | 6.5 | 3.1 | 2.3 | 2.7 | NO | GOOD |
| 4.2:1 | 6.6 | 5.4 | 4.5 | 4.9 | NO | GOOD |

FIG. 7B

ROTATING MEMBER HAVING DIAMETER OF 15 mm AND THICKNESS OF 20 μm

| SPEED RATIO (V1:V2) | MINIMUM THICKNESS d OF RESIN [μm] | TEARING TEST [gf] | | | STRAIN/BEND TEST | EVALUATION |
|---|---|---|---|---|---|---|
| | | MAXIMUM VALUE | MINIMUM VALUE | AVERAGE VALUE | PRESENCE OF BREAKAGE OF CONNECTION PARTS | |
| 1.1:1 | 1.8 | 1.2 | 0.9 | 1.1 | YES | POOR |
| 2.1:1 | 4.5 | 1.5 | 0.9 | 1.2 | YES | POOR |
| 2.9:1 | 7.7 | 4.8 | 2.7 | 3.3 | NO | GOOD |
| 4.2:1 | 6.4 | 8.4 | 3.2 | 4.1 | NO | GOOD |

FIG. 8A

ROTATING MEMBER HAVING DIAMETER OF 15 mm AND THICKNESS OF 50 μm

| SPEED RATIO (V1:V2) | MINIMUM THICKNESS d OF RESIN [μm] | TEARING TEST [gf] | | | STRAIN/BEND TEST | EVALUATION |
|---|---|---|---|---|---|---|
| | | MAXIMUM VALUE | MINIMUM VALUE | AVERAGE VALUE | PRESENCE OF BREAKAGE OF CONNECTION PARTS | |
| 1.1:1 | 3.6 | 1.4 | 0.5 | 0.7 | YES | POOR |
| 2.1:1 | 4.1 | 2.3 | 1.1 | 1.6 | YES | POOR |
| 2.9:1 | 6.5 | 5.7 | 2.6 | 3.0 | NO | GOOD |
| 4.2:1 | 8.4 | 7.1 | 3.1 | 4.3 | NO | GOOD |

FIG. 8B

ROTATING MEMBER HAVING DIAMETER OF 15 mm AND THICKNESS OF 110 μm

| SPEED RATIO (V1:V2) | MINIMUM THICKNESS d OF RESIN [μm] | TEARING TEST [gf] | | | STRAIN/BEND TEST | EVALUATION |
|---|---|---|---|---|---|---|
| | | MAXIMUM VALUE | MINIMUM VALUE | AVERAGE VALUE | PRESENCE OF BREAKAGE OF CONNECTION PARTS | |
| 1.1:1 | 2.4 | 1.2 | 0.6 | 1.0 | YES | POOR |
| 2.1:1 | 3.8 | 1.9 | 0.5 | 1.2 | YES | POOR |
| 2.9:1 | 7.1 | 6.4 | 3.5 | 4.7 | NO | GOOD |
| 4.2:1 | 7.8 | 8.1 | 4.3 | 5.5 | NO | GOOD |

FIG. 8C

METHOD AND DEVICE FOR MANUFACTURING OPTICAL FIBER RIBBON

TECHNICAL FIELD

The present invention relates to a method and device for manufacturing an optical fiber ribbon.

BACKGROUND

Optical fiber ribbons in which a plurality of optical fibers are arranged side by side in the radial direction to form a ribbon shape are conventionally known in the art. For example, Patent Literature 1 discloses an optical fiber ribbon wherein adjacent optical fibers are connected by connection parts that are provided intermittently in the length direction of the optical fibers.

CITATION LIST

Patent Literature 1: JP 2010-33010A

In such optical fiber ribbons as those disclosed in Patent Literature 1, if the strength of the connection parts is weak, the connection parts may break when a force, such as a bending force, is applied thereto.

One or more embodiments of the present invention provide a method and device for manufacturing an optical fiber ribbon with which the strength of connection parts connecting adjacent optical fibers can be increased.

SUMMARY

One or more embodiments of the present invention are directed to a method for manufacturing an optical fiber ribbon in which adjacent optical fibers are connected intermittently in a length direction, the method involving: feeding the optical fibers along the length direction; and applying a resin intermittently in the length direction by rotating, between adjacent ones of the optical fibers, a rotating member having a recess, wherein a moving speed, in the length direction, of a peripheral edge part of the rotating member at a position where the peripheral edge part of the rotating member blocks the resin between the optical fibers is slower than a feeding speed of the optical fibers.

Other features of the invention are disclosed in the present description and accompanying drawings.

The invention can increase the strength of connection parts connecting adjacent optical fibers.

BRIEF DESCRIPTION OF DRAWINGS

FIG. 5A is a table showing test results for Example 1. FIG. 5B is a table showing test results for Example 2.

FIG. 6 is a table showing test results for Example 3.

FIG. 7 is a table showing test results for Example 4, wherein FIG. 7A shows the results for when the diameter is 5 mm, and FIG. 7B shows the results for when the diameter is 25 mm.

FIG. 8 is a table showing test results for Example 5, wherein FIG. 8A shows the results for when the thickness is 20 μm, FIG. 8B shows the results for when the thickness is 50 μm, and FIG. 8C shows the results for when the thickness is 110 μm.

DETAILED DESCRIPTION

At least the following matters are disclosed in the present description and accompanying drawings.

Disclosed is a method according to one or more embodiments for manufacturing an optical fiber ribbon in which adjacent optical fibers are connected intermittently in a length direction, the method involving: feeding the optical fibers along the length direction; and applying a resin intermittently in the length direction by rotating, between adjacent ones of the optical fibers, a rotating member having a recess, wherein a moving speed, in the length direction, of a peripheral edge part of the rotating member at a position where the peripheral edge part of the rotating member blocks the resin between the optical fibers is slower than a feeding speed of the optical fibers.

With this optical fiber ribbon manufacturing method of one or more embodiments, the strength of connection parts connecting adjacent optical fibers can be increased, and the connection parts are less likely to break even when force, such as bending force, is applied.

In the optical fiber ribbon manufacturing method of one or more embodiments, the feeding speed of the optical fibers is at least 2.9 times the moving speed, in the length direction, of the peripheral edge part caused by rotation of the rotating member at the position where the resin is blocked between the optical fibers.

With this optical fiber ribbon manufacturing method of one or more embodiments, the strength of connection parts connecting adjacent optical fibers can be further increased.

In the optical fiber ribbon manufacturing method of one or more embodiments, the feeding speed of the optical fibers is at most 35.1 times the moving speed, in the length direction, of the peripheral edge part caused by rotation of the rotating member at the position where the resin is blocked between the optical fibers.

With this optical fiber ribbon manufacturing method of one or more embodiments, the strength of connection parts connecting adjacent optical fibers can be further increased.

Also disclosed is an optical fiber ribbon manufacturing device of one or more embodiments that manufactures an optical fiber ribbon according to the aforementioned optical fiber ribbon manufacturing method.

With this optical fiber ribbon manufacturing device of one or more embodiments, it is possible to manufacture an optical fiber ribbon in which connection parts connecting adjacent optical fibers are less likely to break.

Configuration of Optical Fiber Ribbon 1

The configuration of an optical fiber ribbon 1 according to one or more embodiments is described with reference to FIGS. 1A and 1B.

Figure 1A:
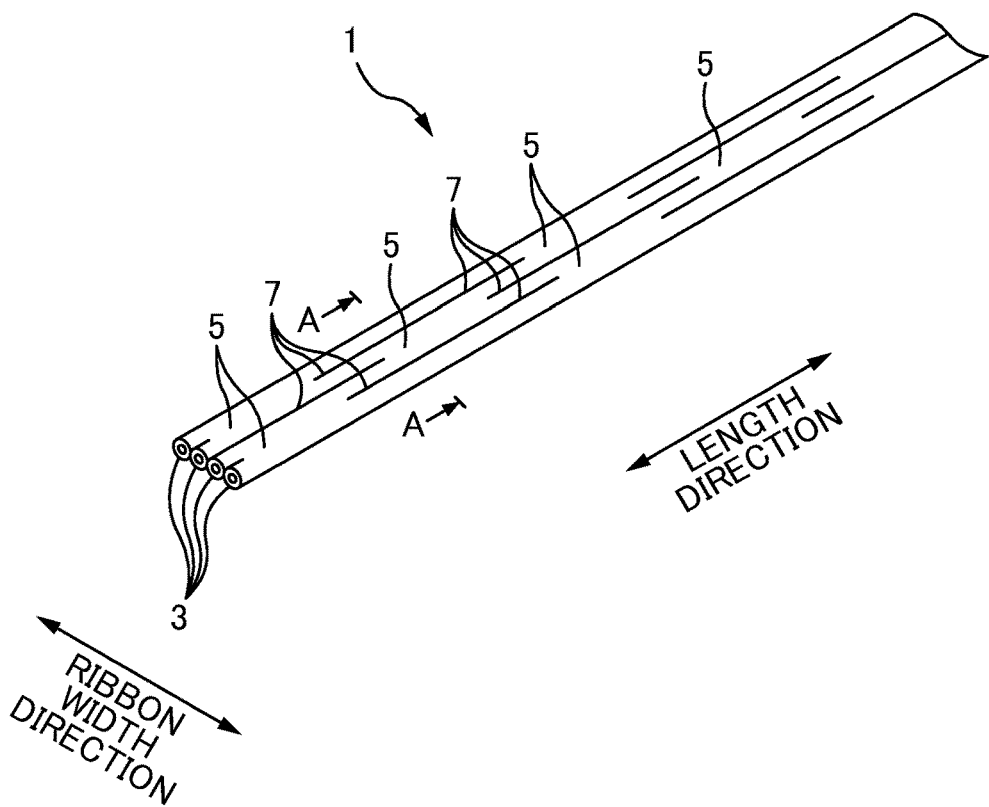
FIG. 1A is a perspective view illustrating an example of a configuration of an optical fiber ribbon according to one or more embodiments of the invention.

FIG. 1A is a perspective view illustrating an example of a configuration of an optical fiber ribbon 1 according to one or more embodiments. FIG. 1B is a cross-sectional view taken along line A-A of FIG. 1A.

The optical fiber ribbon 1 has a ribbon-like shape wherein a plurality of optical fibers 3 are arranged side by side in a direction intersecting with the optical axis direction and wherein adjacent optical fibers 3 are connected. FIGS. 1A and 1B illustrate an optical fiber ribbon 1 formed by arranging four optical fibers 3 side by side.

In the description below, the optical axis direction of the optical fibers 3 is referred to as "length direction" and the direction in which the optical fibers 3 are lined up is referred to as "ribbon width direction".

Adjacent ones of the optical fibers 3 are connected by a plurality of connection parts 5 that are arranged intermittently in the length direction. The connection parts 5 are arranged intermittently in a two-dimensional pattern in the length direction and the ribbon width direction. As illustrated in FIG. 1B, each connection part 5 is formed by a resin 9 that covers the outer circumference of the optical fibers 3.

Between adjacent optical fibers 3, the adjacent optical fibers 3 are not connected in regions other than the connection parts 5, and separated parts 7 (non-connected parts) are formed therebetween. Stated differently, in each separated part 7, the adjacent optical fibers 3 are not bound with one another. In this way, the optical fiber ribbon 1 can be rolled up into a tubular shape or be folded up, and a multitude of optical fibers 3 can be bundled with high density.

Figure 1B:
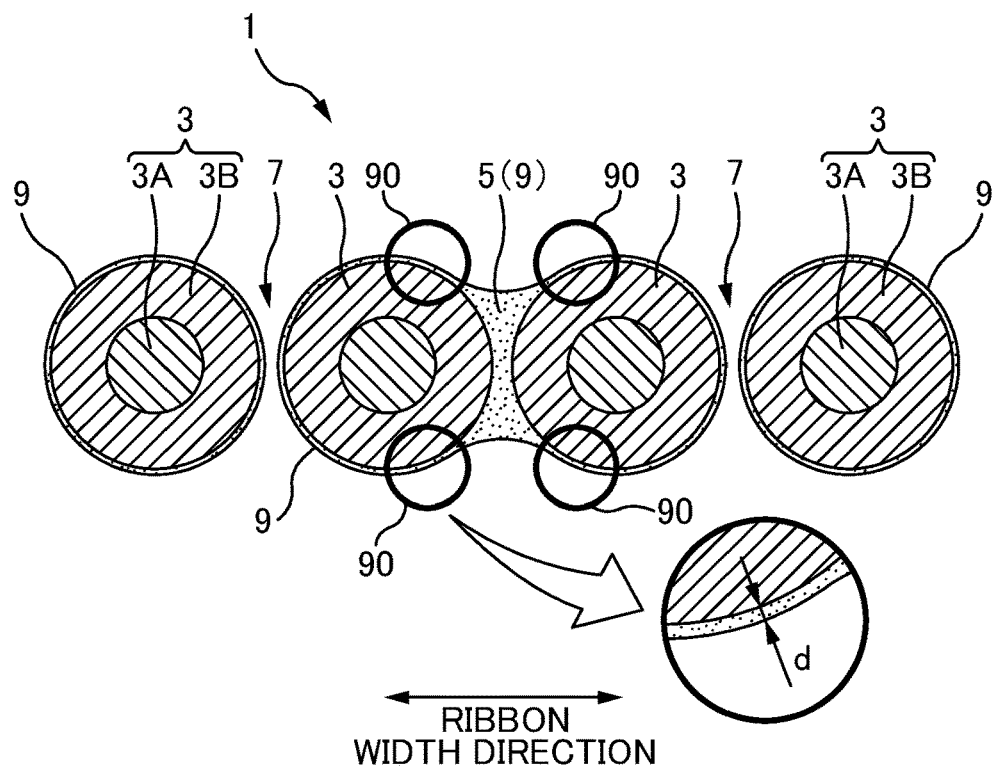
FIG. 1B is a cross-sectional view taken along line A-A of FIG. 1A.

As illustrated in FIG. 1B, each optical fiber 3 includes a glass fiber 3A, and a cover layer 3B that covers the outer circumference of the glass fiber 3A. The resin 9 covers the outer circumference of the cover layer 3B, and a portion of the resin 9 constitutes the connection part 5, as described above. For example, a UV-curable resin can be used for the resin 9.

Configuration of Manufacturing Device 2 and Method for Manufacturing Optical Fiber Ribbon 1

Next, the configuration of a manufacturing device 2 for manufacturing the optical fiber ribbon 1, and a method for manufacturing the optical fiber ribbon 1 are described with reference to FIGS. 2A, 2B, and 3.

Figure 2A:
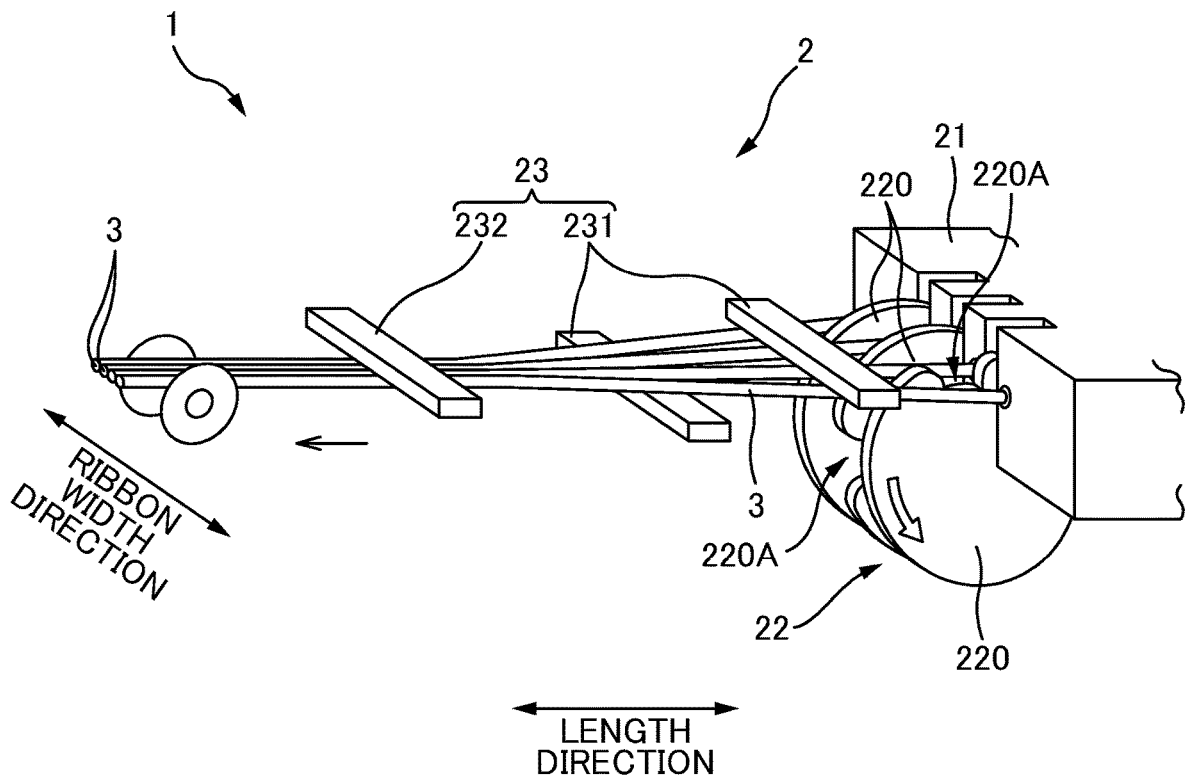
FIG. 2A is a perspective view illustrating an example of a configuration of an optical fiber ribbon manufacturing device according to one or more embodiments.

FIG. 2A is a perspective view illustrating an example of a configuration of a manufacturing device 2 for manufacturing the optical fiber ribbon 1. FIG. 2B is a plan view illustrating a state in which adjacent optical fibers 3 are connected by connection parts 5. FIG. 3 is an explanatory diagram illustrating a relationship between an optical fiber 3 and a rotating member 220.

As illustrated in FIG. 2A, the manufacturing device 2 includes: a feeding unit (not illustrated) configured to feed a plurality of optical fibers 3 (four in FIG. 2A); an application unit 21 configured to apply molten resin (resin 9) to the plurality of optical fibers 3; a removing unit 22 configured to remove the molten resin; and a light source unit 23 configured to irradiate the molten resin with UV rays.

The feeding unit is a section for feeding the plurality of optical fibers 3 along the length direction. The application unit 21 is a section for applying molten resin to the outer circumference of the optical fibers 3 and between adjacent optical fibers 3. The removing unit 22 includes a plurality of rotating members 220 (three in FIG. 2A), and is a section that rotates the rotating members 220 between the adjacent optical fibers 3 and blocks the molten resin, to thereby remove the molten resin.

Figure 3:
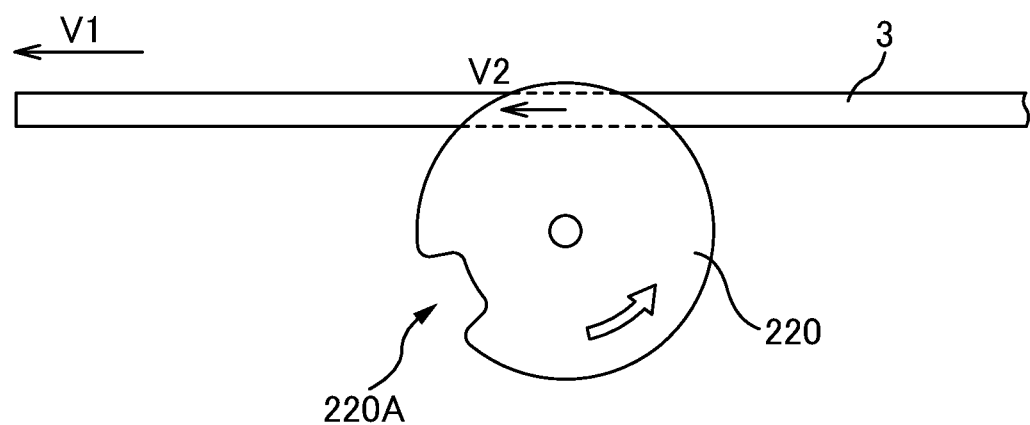
FIG. 3 is an explanatory diagram illustrating a relationship between an optical fiber and a rotating member according to one or more embodiments.

As illustrated in FIG. 3, each rotating member 220 has a disk shape that rotates about an axis along the ribbon width direction, and includes a recess 220A in a portion of its peripheral edge part. In FIG. 3, the rotating member 220 includes only one recess 220A. However, the number of recesses 220A is not necessarily limited to one, and the size and number of recesses 220A can be varied depending on the use.

When each rotating member 220 is rotated (in the counterclockwise direction in FIG. 3) and the peripheral edge part where no recess 220A is formed comes between adjacent optical fibers 3, the peripheral edge part blocks the molten resin. This thereby forms a section that becomes a separated part 7 (see FIGS. 1A, 1B, and 2B). On the other hand, when the recess 220A comes between adjacent optical fibers 3, the molten resin is not blocked and flows into the recess 220A. This thereby forms a section that becomes a connection part 5 (see FIGS. 1A, 1B, and 2B).

The moving speed V2, in the length direction, of the peripheral edge part (i.e., the peripheral edge part where no recess 220A is formed) of the rotating member 220 at the position where the peripheral edge part blocks the molten resin between adjacent optical fibers 3 is set so as to be slower than the feeding speed V1 of the plurality of optical fibers 3 (the optical fiber ribbon 1) (i.e., V2<V1). Herein "the moving speed V2, in the length direction, of the peripheral edge part of the rotating member 220 at the position where the peripheral edge part blocks the molten resin between adjacent optical fibers 3" is the speed found by converting the rotation speed (rpm) of the rotating member 220 into meters per minute (m/min) on the basis of the circumference (m) of the rotating member.

Heretofore, the feeding speed V1 of the optical fibers 3 was the same as the moving speed V2, in the length direction, of the peripheral edge part of the rotating member 220 (V1=V2). In contrast, Inventors have found that setting the speed to V2<V1 increases the strength of the connection parts 5 and the resin 9 (i.e., sections illustrated in FIG. 1B; hereinafter "thin parts 90") formed continuously from the respective connection parts 5 and adjacent thereto. The reason to this is thought to be that, compared to when the speed is V1=V2, a greater amount of molten resin is blocked by the peripheral edge part where no recess 220A is formed, and the blocked molten resin flows into the sections that become the connection parts 5 and the thin parts 90—i.e., the spreading of the molten resin is improved—and thus the connection parts 5 and the thin parts 90 are formed thicker ("d" illustrated in FIG. 1B) and their strength is increased. The relationship between the feeding speed V1, the moving speed V2, and the thickness d of the thin part 90 will be described further below.

The light source unit 23 is a section for irradiating the molten resin applied to the optical fibers 3 with UV rays to cure the molten resin. As illustrated in FIG. 2A, the light source unit 23 includes temporary curing light sources 231 and a permanent curing light source 232.

The molten resin is irradiated with UV rays by the temporary curing light sources 231 and is temporarily cured, and then irradiated with UV rays by the permanent curing light source 232 and is permanently cured. Herein, "temporarily cured" refers to a state where the resin has not been completely cured yet but curing has progressed on the surface. "Permanently cured" refers to a state where curing has progressed also on the inside. Note that, even in a permanently cured state, the optical fiber ribbon 1 has a degree of elasticity capable of being rolled up into a tubular form or being folded up.

Figure 2B:
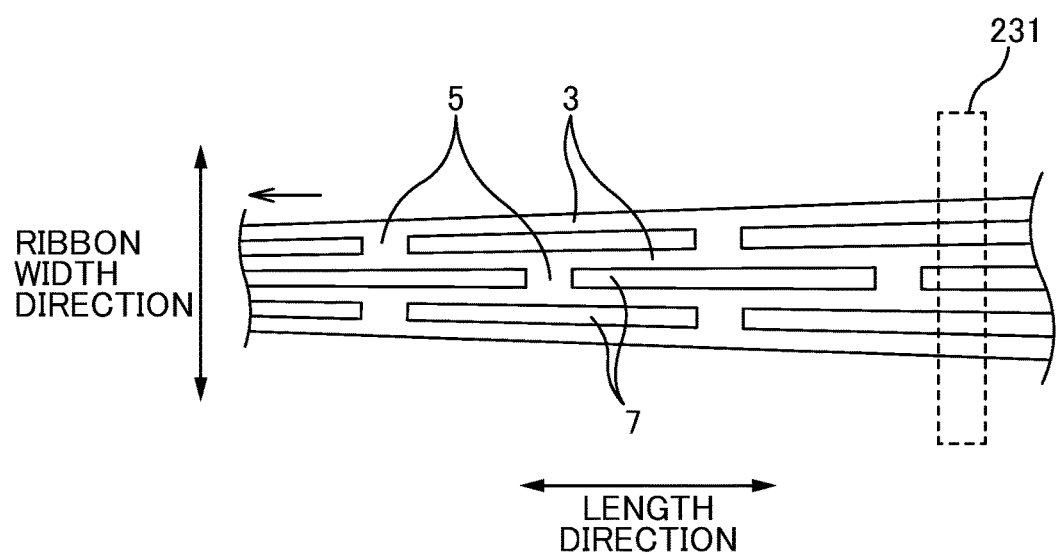
FIG. 2B is a plan view illustrating a state in which adjacent optical fibers are connected by connection parts.

As illustrated in FIG. 2B, the optical fibers 3 immediately after exiting the application unit 21 and the removing unit 22 are separated from one another with spacings therebetween. In this state, the molten resin is irradiated with UV rays by the temporary curing light sources 231 and the molten resin is temporarily cured. Then, the spacings between adjacent optical fibers 3 are gradually narrowed, to align the optical fibers 3 and gather them into a ribbon form. In FIG. 2B, the temporary curing light source 231 is illustrated with a broken line.

At the time of gathering the optical fibers 3, even if adjacent optical fibers 3 contact one another at sections that become the separated parts 7, these sections do not get connected together, since the molten resin is in a temporarily cured state. Also, because the molten resin has yet to be permanently cured, the spacings between adjacent optical fibers 3 can be narrowed easily, even in sections that become the connection parts 5.

As described above, an optical fiber ribbon 1 is manufactured through the steps of: feeding a plurality of optical fibers 3 along the length direction; applying molten resin (resin 9) intermittently in the length direction by rotating a rotating member 220 between adjacent ones of the optical fibers 3; irradiating the molten resin with UV rays to cure the resin; and gathering the optical fibers 3 together.

EXAMPLES

In Examples 1 to 5, optical fiber ribbons 1 were manufactured by varying the feeding speed V1 of the optical fibers 3 and the moving speed V2, in the length direction, of the peripheral edge part of the rotating member 220. Examples 1 to 5 are described with reference to FIGS. 4A and 4B. As for the evaluation of the connection parts 5, Examples 1 and 2 are described with reference to FIGS. 5A and 5B, Example 3 is described with reference to FIG. 6, Example 4 is described with reference to FIGS. 7A and 7B, and Example 5 is described with reference to FIGS. 8A to 8C.

Figure 4A:
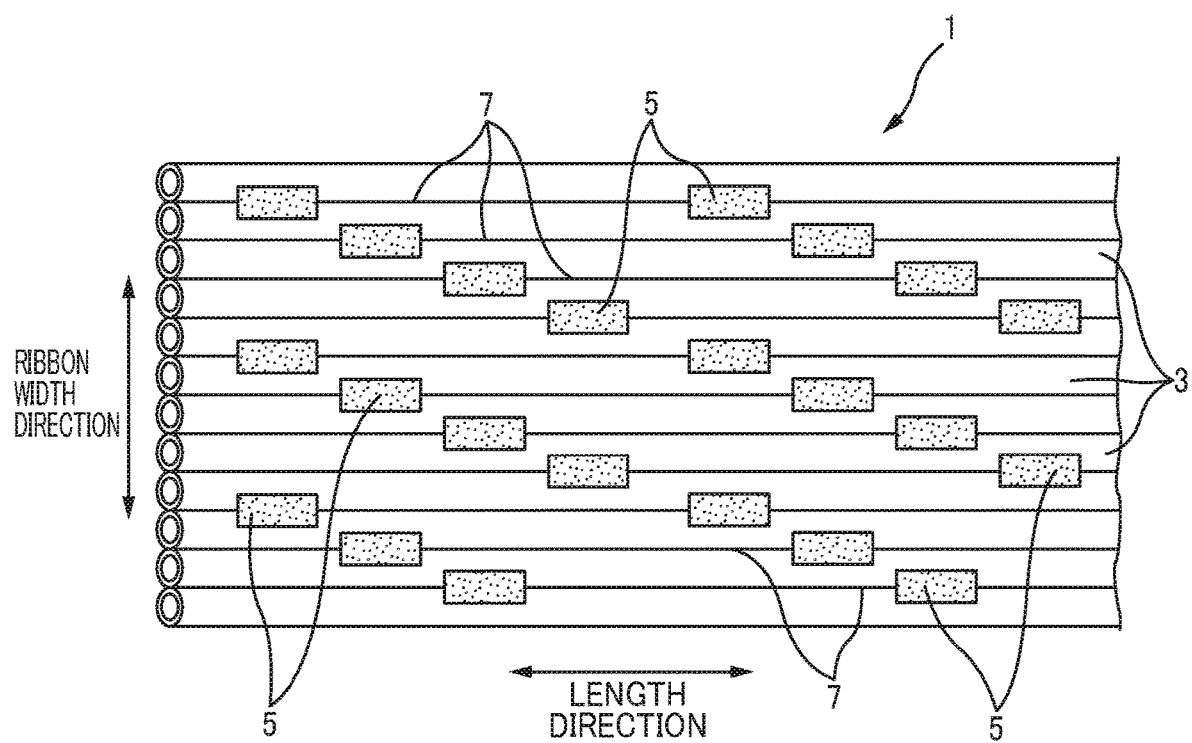
FIG. 4A is a schematic diagram illustrating an optical fiber ribbon of Examples 1 to 5.
Figure 4B:
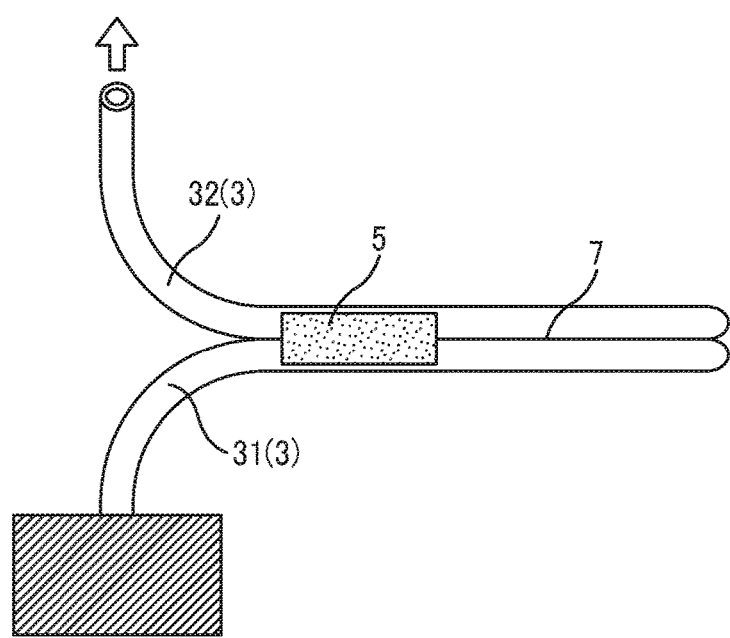
FIG. 4B is an explanatory diagram illustrating a tearing test in Examples 1, 3, 4, and 5.

FIG. 4A is a schematic diagram illustrating an optical fiber ribbon 1 of Examples 1 to 5. FIG. 4B is an explanatory diagram illustrating a tearing test in Examples 1, 3, 4, and 5. FIG. 5A is a table showing test results for Example 1. FIG. 5B is a table showing test results for Example 2. FIG. 6 is a table showing test results for Example 3. FIG. 7 is a table showing test results for Example 4, wherein FIG. 7A shows the results for when the diameter is 5 mm, and FIG. 7B shows the results for when the diameter is 25 mm. FIG. 8 is a table showing test results for Example 5, wherein FIG. 8A shows the results for when the thickness is 20 μm, FIG. 8B shows the results for when the thickness is 50 μm, and FIG. 8C shows the results for when the thickness is 110 μm.

Example 1

In Example 1, a 12-fiber optical fiber ribbon 1 as illustrated in FIG. 4A was prepared by using twelve optical fibers 3 having a diameter of 250 μm. In this Example, a molten resin having a viscosity of 0.1 Pa·s was used. The feeding speed V1 of the twelve optical fibers 3 was varied within a range from 150.0 to 900.0 m/min, and the moving speed V2, in the length direction, of the peripheral edge part of the rotating member 220 was varied within a range from 113.1 to 282.6 m/min. The concrete relationships (speed ratios) between the feeding speed V1 and the moving speed V2 are as shown in FIG. 5A.

As illustrated in FIG. 4A, the size and number of recesses 220A in the respective rotating members 220 were adjusted such that all of the connection parts 5 had the same size. In Example 1, the length of each connection part 5 in the length direction was 15 mm, and the length of each separated part 7 in the length direction was 55 mm. The rotating member 220 used had a diameter of 15 mm and a thickness of 80 μm.

In the optical fiber ribbon 1 illustrated in FIG. 4A, the thickness d of the thin part 90 in each of the twelve optical fibers 3 was measured. The measurement result of the thickness d of the thin part 90 is as shown as "minimum thickness d of resin" in FIG. 5A. More specifically, the "minimum thickness d of resin" is a value calculated by averaging the thicknesses of the respective thin parts 90 (i.e., the minimum values of the thickness of the resin 9) in the respective twelve optical fibers 3.

As illustrated in FIG. 5A, it can be understood that, by delaying the moving speed V2 with respect to the feeding speed V1, the value of the minimum thickness d of the resin becomes greater (thicker). Breakage of a connection part 5 occurs as a result of the resin 9 peeling from the thin parts 90 and the connection part 5 thus getting split and breaking. Thus, by increasing the minimum thickness d of the resin by adjusting the speed ratio V1:V2, it is possible to increase the strength of the connection parts 5 and the thin parts 90 and thus inhibit the connection parts 5 from breaking.

The optical fiber ribbon 1 illustrated in FIG. 4A was subjected to a tearing test at thirty-three connection parts 5. The tearing test was performed, as illustrated in FIG. 4B, by: fixing an end of one optical fiber 31 among a pair of adjacent optical fibers 31, 32; pulling the other optical fiber 32 at 100 mm/min in the direction of the arrow illustrated in FIG. 4B; and measuring the load (gf) applied to the connection part 5 at this time.

More specifically, one optical fiber 31 is fixed at a position 10 cm away from one end (the end on the side to be torn) of the connection part 5, and the other optical fiber 32 is pulled. The unfixed end of the one optical fiber 31 and the non-pulled end of the other optical fiber 32 are located at a position 15 cm away from one end (the end on the side to be torn) of the connection part 5.

In this tearing test, the load applied to the connection part 5 is considered the tearing force. FIG. 5A shows the maximum value, the minimum value, and the average value of the tearing force for when the feeding speed V1 of the optical fibers 3 and the moving speed V2, in the length direction, of the peripheral edge part of the rotating member 220 were varied.

Next, the optical fiber ribbons 1 illustrated in FIG. 4A were used to prepare a 144-fiber optical fiber cable, and the cable was subjected to a strain/bend test. The strain/bend test was performed according to IEC 60794-1-2-E18 under the following conditions: tension: 130 kg; mandrel diameter: 250 mm; bending angle: 90°. After the strain/bend test, the 144-fiber optical fiber cable was disassembled, to verify whether there was breakage of the connection parts 5 in the optical fiber ribbon 1. The verification results are shown in FIG. 5A.

With reference to the results of the tearing test and the results of the strain/bend test, it can be understood that, when the minimum value of the tearing force in the tearing test is 2.1 gf or greater, there is "no" breakage of the connection parts 5 after the strain/bend test. When the minimum value of the tearing force in the tearing test is 2.1 gf, the speed ratio V1:V2 between the feeding speed V1 of the optical fibers 3 and the moving speed V2, in the length direction, caused by the rotation of the rotating member 220 is 2.9:1. At this ratio, the value of the minimum thickness d of the resin is 6.8 µm, which is about twice the thickness at a speed ratio V1:V2 of 1.1:1, at which the value of the minimum thickness d of the resin is 3.5 µm. Thus, it can be understood that, when the feeding speed V1 of the optical fibers 3 is at least 2.9 times the moving speed V2, in the length direction, of the peripheral edge part of the rotating member 220, the thickness of the thin part 90 (minimum thickness d of the resin) is greater and the strength of the connection parts 5 and the thin parts 90 is further increased, and it is thereby possible to further inhibit breakage of the connection parts 5, compared to cases where V1=V2.

Note that, in one or more embodiments, although the feeding speed V1 of the optical fibers 3 is at least 2.9 times the moving speed V2, in the length direction, of the peripheral edge part of the rotating member 220, FIG. 5A shows that the tearing force in the tearing test is increased even when the speed ratio V1:V2 is 2.1:1 and thus the strength of the connection parts 5 and the thin parts 90 is increased. Thus, the strength of the connection parts 5 and the thin parts 90 is increased so long as the speed relationship is at least V1>V2.

Example 2

In Example 2, a 12-fiber optical fiber ribbon 1 as illustrated in FIG. 4A was prepared by using twelve optical fibers 3 having a diameter of 250 µm, as in Example 1, and length difference measurement and the strain/bend test were performed within a range where there was "no" breakage of the connection parts 5 after the strain/bend test in Example 1—i.e., within a range where the feeding speed V1 of the optical fibers 3 was at least 2.9 times the moving speed V2, in the length direction, of the peripheral edge part of the rotating member 220. The strain/bend test was performed under the same conditions as in Example 1.

More specifically, the feeding speed V1 of the twelve optical fibers 3 was varied within a range from 400.0 to 900.0 m/min, and the moving speed V2, in the length direction, of the peripheral edge part of the rotating member 220 was varied within a range from 13.2 to 59.4 m/min. The concrete relationships (speed ratios) between the feeding speed V1 and the moving speed V2 are as shown in FIG. 5B.

The length difference is represented by the percentage (%) found by dividing, by the length of the optical fiber ribbon 1 in the length direction, the difference between the length of the optical fiber ribbon 1 in the length direction and the length, in the length direction, of a single optical fiber 3 individually separated from the optical fiber ribbon 1. FIG. 5B shows the maximum value, the minimum value, and the average value of the length difference for when the feeding speed V1 of the optical fibers 3 and the moving speed V2, in the length direction, of the peripheral edge part of the rotating member 220 were varied.

If the length difference is large, slight bending may be applied to the optical fibers 3, which may lead to an increase in transmission loss and/or breaking of the optical fibers 3 when the optical fiber ribbon 1 is used to prepare an optical fiber cable. Thus, the length difference is less than ±0.1%.

With reference to the results of measuring the length difference shown in FIG. 5B, it can be verified that the maximum value of the length difference is 0.13% when the speed ratio V1:V2 is 40.0:1, and the maximum value of the length difference is 0.12% when the speed ratio V1:V2 is 45.5:1.

Thus, taking the length difference into consideration, the feeding speed V1 of the optical fibers 3 is from 2.9 to 35.1 times the moving speed V2, in the length direction, of the peripheral edge part of the rotating member 220. Note that, in Example 2, at all of the ratios, there was "no" breakage of the connection parts 5 after the strain/bend test.

Example 3

In Example 3, a 12-fiber optical fiber ribbon 1 as illustrated in FIG. 4A was prepared by using twelve optical fibers 3 having a diameter of 250 µm, as in Example 1, by setting the speed ratios V1:V2 between the feeding speed V1 and the moving speed V2 to four ratios, i.e., 1.1:1, 2.1:1, 2.9:1, and 4.2:1, and the tearing test and the strain/bend test were performed. Different from Example 1, a molten resin having a viscosity of 5.0 Pa·s was used in this Example. Other conditions, such as the size of the rotating members 220, were the same as in Example 1.

FIG. 6 shows the maximum value, the minimum value, and the average value of the tearing force in the tearing test, and the results of the presence/absence of breakage of the connection parts 5 after the strain/bend test. With reference to the results of the tearing test and the results of the strain/bend test, it can be understood that, when the minimum value of the tearing force in the tearing test is 2.0 gf or greater, there is "no" breakage of the connection parts 5 after the strain/bend test. When the minimum value of the tearing force in the tearing test is 2.0 gf, the speed ratio V1:V2 is 2.9:1. Thus, as in Example 1, it can be understood that, when the feeding speed V1 of the optical fibers 3 is at least 2.9 times the moving speed V2, in the length direction, of the peripheral edge part of the rotating member 220, the strength of the connection parts 5 and the thin parts 90 can be increased. From the above, it can be understood that, regardless of the viscosity of the molten resin used, the strength of the connection parts 5 and the thin parts 90 can be increased according to the speed ratio between the feeding speed V1 and the moving speed V2.

Example 4

In Example 4, rotating members 220 having different diameters from the rotating members 220 used in Examples 1 to 3 were used to prepare a 12-fiber optical fiber ribbon 1 as illustrated in FIG. 4A, and the tearing test and the strain/bend test were performed. In this Example, the thickness of the rotating members 220 was set to a constant value of 80 µm, whereas the rotating members were prepared in two diameters, 5 mm and 25 mm. Other conditions, such as the viscosity of the molten resin, were the same in these two cases.

FIG. 7A shows the minimum thickness d of the resin, the maximum value, the minimum value, and the average value of the tearing force, and the results of the presence/absence of breakage of the connection parts 5 after the strain/bend test in the case where the diameter of the rotating member 220 was 5 mm. With reference to the results of the tearing test and the results of the strain/bend test, it can be understood that, when the minimum value of the tearing force in the tearing test is 4.4 gf or greater, there is "no" breakage of the connection parts 5 after the strain/bend test.

As in Example 1, also in this case, it can be understood that, by delaying the moving speed V2 with respect to the feeding speed V1, the value of the minimum thickness d of the resin becomes greater (thicker). When the minimum value of the tearing force in the tearing test is 4.4 gf, the minimum thickness d of the resin is 7.3 µm. At this value, the speed ratio V1:V2 is 2.9:1. Thus, as in Examples 1 and 3, it can be understood that, when the feeding speed V1 of the optical fibers 3 is at least 2.9 times the moving speed V2, in the length direction, of the peripheral edge part of the rotating member 220, the strength of the connection parts 5 and the thin parts 90 can be increased.

FIG. 7B shows the minimum thickness d of the resin, the maximum value, the minimum value, and the average value of the tearing force, and the results of the presence/absence of breakage of the connection parts 5 after the strain/bend test in the case where the diameter of the rotating member 220 was 25 mm. With reference to the results of the tearing test and the results of the strain/bend test, it can be understood that, when the minimum value of the tearing force in the tearing test is 2.3 gf or greater, there is "no" breakage of the connection parts 5 after the strain/bend test.

As in the case where the diameter of the rotating member 220 is 5 mm, also in this case, it can be understood that, by delaying the moving speed V2 with respect to the feeding speed V1, the value of the minimum thickness d of the resin becomes greater (thicker). When the minimum value of the tearing force in the tearing test is 2.3 gf, the minimum thickness d of the resin is 6.5 µm. At this value, the speed ratio V1:V2 is 2.9:1. Thus, as in the case where the diameter of the rotating member 220 is 5 mm, it can be understood that, when the feeding speed V1 of the optical fibers 3 is at least 2.9 times the moving speed V2, in the length direction, of the peripheral edge part of the rotating member 220, the strength of the connection parts 5 and the thin parts 90 can be increased.

As described above, in both cases where the diameter of the rotating member 220 is 5 mm and 25 mm, the evaluation results are "good" in cases where the feeding speed V1 of the optical fibers 3 is at least 2.9 times the moving speed V2, in the length direction, of the peripheral edge part of the rotating member 220. Thus, it can be understood that, regardless of the diameter of the rotating members 220, the strength of the connection parts 5 and the thin parts 90 can be increased according to the speed ratio between the feeding speed V1 and the moving speed V2.

Example 5

In Example 5, rotating members 220 having different thicknesses from the rotating members 220 used in Examples 1 to 3 were used to prepare a 12-fiber optical fiber ribbon 1 as illustrated in FIG. 4A, and the tearing test and the strain/bend test were performed. In this Example, the diameter of the rotating members 220 was set to a constant value of 15 mm, whereas the rotating members were prepared in three thicknesses, 20 µm, 50 µm, and 110 µm. As in Example 4, other conditions, such as the viscosity of the molten resin, were the same in these three cases.

FIG. 8A shows the minimum thickness d of the resin, the maximum value, the minimum value, and the average value of the tearing force, and the results of the presence/absence of breakage of the connection parts 5 after the strain/bend test in the case where the thickness of the rotating member 220 was 20 µm. With reference to the results of the tearing test and the results of the strain/bend test, it can be understood that, when the minimum value of the tearing force in the tearing test is 2.7 gf or greater, there is "no" breakage of the connection parts 5 after the strain/bend test.

As in Examples 1 and 4, also in this case, it can be understood that, by delaying the moving speed V2 with respect to the feeding speed V1, the value of the minimum thickness d of the resin becomes greater (thicker). When the minimum value of the tearing force in the tearing test is 2.7 gf, the minimum thickness d of the resin is 7.7 µm. At this value, the speed ratio V1:V2 is 2.9:1. Thus, as in Examples 1 and 3, it can be understood that, when the feeding speed V1 of the optical fibers 3 is at least 2.9 times the moving speed V2, in the length direction, of the peripheral edge part of the rotating member 220, the strength of the connection parts 5 and the thin parts 90 can be increased.

FIG. 8B shows the minimum thickness d of the resin, the maximum value, the minimum value, and the average value of the tearing force, and the results of the presence/absence of breakage of the connection parts 5 after the strain/bend test in the case where the thickness of the rotating member 220 was 50 µm. With reference to the results of the tearing test and the results of the strain/bend test, it can be understood that, when the minimum value of the tearing force in the tearing test is 2.6 gf or greater, there is "no" breakage of the connection parts 5 after the strain/bend test.

As in the case where the thickness of the rotating member 220 is 20 µm, also in this case, it can be understood that, by delaying the moving speed V2 with respect to the feeding speed V1, the value of the minimum thickness d of the resin becomes greater (thicker). When the minimum value of the tearing force in the tearing test is 2.6 gf, the minimum thickness d of the resin is 6.5 µm. At this value, the speed ratio V1:V2 is 2.9:1. Thus, as in the case where the thickness of the rotating member 220 is 20 µm, it can be understood that, when the feeding speed V1 of the optical fibers 3 is at least 2.9 times the moving speed V2, in the length direction, of the peripheral edge part of the rotating member 220, the strength of the connection parts 5 and the thin parts 90 can be increased.

FIG. 8C shows the minimum thickness d of the resin, the maximum value, the minimum value, and the average value of the tearing force, and the results of the presence/absence of breakage of the connection parts 5 after the strain/bend test in the case where the thickness of the rotating member 220 was 110 µm. With reference to the results of the tearing test and the results of the strain/bend test, it can be understood that, when the minimum value of the tearing force in the tearing test is 3.5 gf or greater, there is "no" breakage of the connection parts 5 after the strain/bend test.

As in the cases where the thicknesses of the rotating members 220 are 20 µm and 50 µm, also in this case, it can be understood that, by delaying the moving speed V2 with respect to the feeding speed V1, the value of the minimum thickness d of the resin becomes greater (thicker). When the minimum value of the tearing force in the tearing test is 3.5 gf, the minimum thickness d of the resin is 7.1 µm. At this value, the speed ratio V1:V2 is 2.9:1. Thus, as in the cases where the thicknesses of the rotating members 220 are 20 µm and 50 µm, it can be understood that, when the feeding speed V1 of the optical fibers 3 is at least 2.9 times the moving speed V2, in the length direction, of the peripheral edge part of the rotating member 220, the strength of the connection parts 5 and the thin parts 90 can be increased.

As described above, in all cases where the thicknesses of the rotating members 220 are 20 µm, 50 µm, and 110 µm, the evaluation results are "good" in cases where the feeding speed V1 of the optical fibers 3 is at least 2.9 times the moving speed V2, in the length direction, of the peripheral edge part of the rotating member 220. Thus, it can be understood that, regardless of the diameter of the rotating members 220, the strength of the connection parts 5 and the thin parts 90 can be increased according to the speed ratio between the feeding speed V1 and the moving speed V2.

Others

The embodiments described above are for facilitating the understanding of the present invention, and are not to be construed as limiting the present invention. The present invention may be modified and/or improved without departing from the gist thereof, and it goes without saying that the present invention encompasses equivalents thereof.

REFERENCE SIGNS LIST

1: Optical fiber ribbon;
2: Optical fiber ribbon manufacturing device;
3: Optical fiber;
9: Resin;
220: Rotating member;
220A: Recess.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for manufacturing an optical fiber ribbon where adjacent optical fibers are intermittently connected in a length direction, the method comprising:
 feeding the optical fibers along the length direction;
 intermittently applying a resin in the length direction by:
  rotating, between adjacent ones of the optical fibers, a rotating member having a recess, and
  blocking the resin with a peripheral edge part of the rotating member where the recess is not formed; and
 increasing strength of a connection part formed by the resin applied to the optical fibers by setting a moving speed, in the length direction, of the peripheral edge part at a position where the peripheral edge part blocks the resin between the optical fibers, to be slower than a feeding speed of the optical fibers.

2. An optical fiber ribbon manufacturing device that manufactures an optical fiber ribbon according to the method as set forth in claim 1.

3. The method according to claim 1, wherein the feeding speed of the optical fibers is at least 2.9 times the moving speed, in the length direction, of the peripheral edge part that is caused by rotation of the rotating member at the position where the resin is blocked between the optical fibers.

4. An optical fiber ribbon manufacturing device that manufactures an optical fiber ribbon according to the method as set forth in claim 3.

5. The method according to claim 3, wherein the feeding speed of the optical fibers is at most 35.1 times the moving speed, in the length direction, of the peripheral edge part that is caused by rotation of the rotating member at the position where the resin is blocked between the optical fibers.

6. An optical fiber ribbon manufacturing device that manufactures an optical fiber ribbon according to the method as set forth in claim 5.

7. A method for manufacturing an optical fiber ribbon where adjacent optical fibers are intermittently connected in a length direction, the method comprising:
 feeding the optical fibers along the length direction;
 intermittently applying a resin in the length direction by:
  rotating, between adjacent ones of the optical fibers, a rotating member having a recess, and
  blocking the resin with a peripheral edge part of the rotating member where the recess is not formed; and
 controlling a thickness of the resin applied to the optical fibers by setting a moving speed, in the length direction, of the peripheral edge part at a position where the peripheral edge part blocks the resin between the optical fibers, to be slower than a feeding speed of the optical fibers.

* * * * *